United States Patent
Tang et al.

(10) Patent No.: US 11,658,782 B2
(45) Date of Patent: May 23, 2023

(54) METHOD AND DEVICE FOR DETERMINING NUMBER OF REFERENCE SIGNALS AND COMPUTER STORAGE MEDIUM

(71) Applicant: GUANGDONG OPPO MOBILE TELECOMMUNICATIONS CORP., LTD., Guangdong (CN)

(72) Inventors: Hai Tang, Guangdong (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/932,296

(22) Filed: Jul. 17, 2020

(65) Prior Publication Data

US 2020/0351051 A1    Nov. 5, 2020

Related U.S. Application Data

(63) Continuation of application No. PCT/CN2018/073670, filed on Jan. 22, 2018.

(51) Int. Cl.
*H04L 1/18* (2006.01)
*H04L 27/26* (2006.01)
(Continued)

(52) U.S. Cl.
CPC .......... *H04L 5/0048* (2013.01); *H04L 1/1861* (2013.01); *H04L 27/2607* (2013.01); *H04L 27/2613* (2013.01); *H04W 76/14* (2018.02)

(58) Field of Classification Search
CPC .............. H04L 1/1861; H04L 27/2607; H04L 27/2613; H04L 5/0023; H04L 5/0048;
(Continued)

(56) References Cited

U.S. PATENT DOCUMENTS

2015/0092729 A1* 4/2015 Shan .................... H04L 5/0048
370/329
2015/0358111 A1* 12/2015 Marinier .............. H04L 1/0003
370/329

(Continued)

FOREIGN PATENT DOCUMENTS

CN            107432024 A     12/2017
EP            3352404 A1     10/1989
(Continued)

OTHER PUBLICATIONS

International Search Report for PCT/CN2018/073670 dated Oct. 11, 2018.

(Continued)

*Primary Examiner* — Melvin C Marcelo
*Assistant Examiner* — Natali Pascual Peguero
(74) *Attorney, Agent, or Firm* — Young Basile Hanlon & MacFarlane, P.C.

(57) ABSTRACT

Disclosed are an information determining method, a device, and a computer storage medium. The method includes: a first terminal determines that the number of first reference signals is N, N being a positive integer; the first terminal transmits to a second terminal a control channel and the N first reference signals, where the control channel is for use by the second terminal in determining that the number of the first parameter signals is the number N so as to receive respectively the N first reference signals via N channels.

18 Claims, 5 Drawing Sheets

---

A first terminal determines that the number of first reference signals is N, wherein N is a positive integer    301

The first terminal sends a control channel and the N first reference signals to a second terminal, wherein the control channel is used for the second terminal to determine that the number of the first reference signals is N to receive the N first reference signals via N channels respectively    302

(51) Int. Cl.
*H04L 5/00* (2006.01)
*H04W 76/14* (2018.01)
*H04L 1/1829* (2023.01)

(58) Field of Classification Search
CPC ...... H04L 5/0053; H04L 5/1469; H04W 4/40; H04W 72/0406; H04W 72/0466; H04W 76/14
See application file for complete search history.

(56) References Cited

U.S. PATENT DOCUMENTS

| | | | |
|---|---|---|---|
| 2017/0019886 A1* | 1/2017 | Patel | H04W 76/14 |
| 2018/0205515 A1* | 7/2018 | Wu | H04L 5/006 |
| 2021/0144524 A1* | 5/2021 | Byun | H04W 72/02 |

FOREIGN PATENT DOCUMENTS

| | | | | |
|---|---|---|---|---|
| EP | 3726901 | A1 | 10/2020 | |
| EP | 3352404 | B1 * | 12/2020 | ........... H04L 5/0051 |
| WO | 2010051663 | A1 | 5/2010 | |
| WO | 2017026977 | A1 | 2/2017 | |
| WO | 2017048064 | A1 | 3/2017 | |

OTHER PUBLICATIONS

ITL. "DM-RS Sequence for PSCCH/PSSCH/PSBCH in V2V", 3GPP TSG RAN WG1 Meeting #86, R1-167750, Aug. 26, 2016.
Extended European Search Report for EP Application 18900863.4 dated Dec. 14, 2020.
Communication pursuant to Article 94(3) EPC for EP Application 18900863.4 dated Nov. 2, 2021. (6 pages).
Extended European Search Report for EP Application 22183738.8 dated Nov. 10, 2022. (11 pages).

* cited by examiner

METHOD AND DEVICE FOR DETERMINING NUMBER OF REFERENCE SIGNALS AND COMPUTER STORAGE MEDIUM

CROSS-REFERENCE TO RELATED APPLICATION(S)

The present application is a continuation application of the International PCT Application No. PCT/CN2018/073670, having an international filing date of Jan. 22, 2018, the entire content of which is hereby incorporated by reference.

TECHNICAL FIELD

The present disclosure relates to the field of wireless communication technologies, in particular to a method and apparatus for determining information and a computer storage medium.

BACKGROUND

A Vehicle-to-Everything system adopts a Sidelink transmission technology based on Long Term Evolution (LTE)-Device to Device (D2D). Different from a traditional LTE system in which communication data is received or sent through a base station, the Vehicle-to-Everything system adopts a direct terminal-to-terminal communication mode, thus having higher spectral efficiency and lower transmission delay.

In the 3rd Generation Partnership Project (3GPP) REL-14, a Vehicle-to-Everything technology (V2X) is standardized and two transmission modes are defined: mode 3 and mode 4. In the mode 3, transmission resources of a terminal are allocated by a base station. In the mode 4, a terminal determines transmission resources by sensing+reservation.

In a New Radio (NR)-V2X, automatic driving needs to be supported, so higher requirements are put forward for data interchange between vehicles, such as higher throughput, lower delay, higher reliability, larger coverage, more flexible resource allocation, etc.

SUMMARY

Embodiments of the present disclosure provide a method and apparatus for determining information and a computer storage medium.

An embodiment of the present disclosure provides a method for determining information, including: determining, by a first terminal, that a number of first reference signals is N, wherein N is a positive integer; and sending, by the first terminal, a control channel and the N first reference signals to a second terminal, wherein the control channel is used for the second terminal to determine that the number of the first reference signals is N to receive the N first reference signals via N channels respectively.

In an embodiment of the present disclosure, the method further includes: determining, by the first terminal, first scrambling sequence corresponding to a value of the N based on a first mapping relationship; and performing, by the first terminal, scrambling operation on the control channel by using the first scrambling sequence; wherein the first scrambling sequence corresponding to the control channel is used for determining that the number of the first reference signals is the N.

In an embodiment of the present disclosure, the method further includes: determining, by the first terminal, the first mapping relationship according to preconfigured information or information configured by a network.

In an embodiment of the present disclosure, the method further includes: determining, by the first terminal, first mask sequence corresponding to a value of the N based on a second mapping relationship; and performing, by the first terminal, masking operation on the control channel by using the first mask sequence; wherein the first mask sequence corresponding to the control channel is used for determining that the number of the first reference signals is the N.

In an embodiment of the present disclosure, the method further includes: determining, by the first terminal, the second mapping relationship according to preconfigured information or information configured by a network.

In an embodiment of the present disclosure, the method further includes: determining, by the first terminal, first codec information corresponding to a value of the N based on a third mapping relationship; and performing, by the first terminal, encoding operation on the control channel by using the first codec information; wherein the first codec information corresponding to the control channel is used for determining that the number of the first reference signals is the N.

In an embodiment of the present disclosure, the first codec information includes at least one of: a demodulation reference signal (DMRS) sequence, a cyclic shift, an orthogonal cover code (OCC) sequence, and a root sequence.

In an embodiment of the present disclosure, the method further includes: determining, by the first terminal, the third mapping relationship according to preconfigured information or information configured by a network.

In an embodiment of the present disclosure, the control channel includes first indication information, and the first indication information is used for determining that the number of the first reference signals is the N.

In an embodiment of the present disclosure, determining, by the first terminal, that the number of first reference signals is N, includes: determining, by the first terminal, that the number of the first reference signals is N according to preconfigured information or information configured by a network.

In an embodiment of the present disclosure, transmission resources of the control channel of the first terminal and the first reference signals are in time-division.

An embodiment of the present disclosure provides a method for determining information, including: determining, by a second terminal, that a number of first reference signals sent by a first terminal is N, wherein N is a positive integer; and receiving, by the second terminal, the N first reference signals sent by the first terminal via N channel respectively, wherein transmission resources of different channels are in time-division.

In an embodiment of the present disclosure, determining, by the second terminal, that the number of first reference signals sent by the first terminal is N, includes: receiving, by the second terminal, a control channel sent by the first terminal, and determining that the number of the first reference signals sent by the first terminal is N based on the control channel, wherein N is a positive integer.

In an embodiment of the present disclosure, receiving, by the second terminal, the control channel sent by the first terminal and determining that the number of the first reference signals sent by the first terminal is N based on the control channel, includes: receiving, by the second terminal, the control channel sent by the first terminal, and performing decoding operation on the control channel by using first codec information; and determining, by the second terminal, a value of N corresponding to the first codec information as the number of the first reference signals based on a third mapping relationship.

In an embodiment of the present disclosure, the first codec information includes at least one of: a DMRS sequence, a cyclic shift, an OCC sequence, and a root sequence.

In an embodiment of the present disclosure, the method further includes: determining, by the second terminal, the third mapping relationship according to preconfigured information or information configured by a network.

In an embodiment of the present disclosure, receiving, by the second terminal, the control channel sent by the first terminal and determining that the number of the first reference signals sent by the first terminal is N based on the control channel, includes: receiving, by the second terminal, the control channel sent by the first terminal, and performing unmasking operation on the control channel by using first mask sequence; and determining, by the second terminal, the value of N corresponding to the first mask sequence as the number of the first reference signals based on a second mapping relationship.

In an embodiment of the present disclosure, the method further includes: determining, by the second terminal, the second mapping relationship according to preconfigured information or information configured by a network.

In an embodiment of the present disclosure, receiving, by the second terminal, the control channel sent by the first terminal and determining that the number of the first reference signals sent by the first terminal is N based on the control channel, includes: receiving, by the second terminal, the control channel sent by the first terminal and performing descrambling operation on the control channel by using first scrambling sequence; and determining, by the second terminal, the value of N corresponding to the first scrambling sequence as the number of the first reference signals based on a first mapping relationship.

In an embodiment of the present disclosure, the method further includes: determining, by the second terminal, the first mapping relationship according to preconfigured information or information configured by a network.

In an embodiment of the present disclosure, receiving, by the second terminal, the control channel sent by the first terminal and determining that the number of the first reference signals sent by the first terminal is N based on the control channel, includes: receiving, by the second terminal, the control channel sent by the first terminal and acquiring first indication information from the control channel; and determining, by the second terminal, the number of the first reference signals based on the first indication information.

In an embodiment of the present disclosure, determining, by the second terminal, that the number of the first reference signals sent by the first terminal is N, includes: determining, by the second terminal, that the number of the first reference signals sent by the first terminal is N according to preconfigured information or information configured by a network.

An embodiment of the present disclosure provides an apparatus for determining information, including: a determination unit, configured to determine that a number of first reference signals is N, wherein N is a positive integer; and a sending unit, configured to send a control channel and N first reference signals to a second terminal, wherein the control channel is used for the second terminal to determine that the number of the first reference signals is N to receive the N first reference signals via N channels respectively.

In an embodiment of the present disclosure, the determination unit is further configured to determine first scrambling sequence corresponding to a value of the N based on a first mapping relationship; and the apparatus further includes a first processing unit configured to perform scrambling operation on the control channel by using the first scrambling sequence; wherein the first scrambling sequence corresponding to the control channel is used for determining that the number of the first reference signals is the N.

In an embodiment of the present disclosure, the determination unit is further configured to determine the first mapping relationship according to preconfigured information or information configured by a network.

In an embodiment of the present disclosure, the determination unit is further configured to determine first mask sequence corresponding to a value of the N based on a second mapping relationship; and the apparatus further includes a second processing unit configured to perform masking operation on the control channel by using the first mask sequence; wherein the first mask sequence corresponding to the control channel is used for determining that the number of the first reference signals is the N.

In an embodiment of the present disclosure, the determination unit is further configured to determine the second mapping relationship according to preconfigured information or information configured by a network.

In an embodiment of the present disclosure, the determination unit is further configured to determine first codec information corresponding to a value of the N based on a third mapping relationship; and the apparatus further includes a third processing unit configured to perform encoding operation on the control channel by using the first codec information; wherein the first codec information corresponding to the control channel is used for determining that the number of the first reference signals is the N.

In an embodiment of the present disclosure, the first codec information includes at least one of: a DMRS sequence, a cyclic shift, an OCC sequence, and a root sequence.

In an embodiment of the present disclosure, the determination unit is further configured to determine the third mapping relationship according to preconfigured information or information configured by a network.

In an embodiment of the present disclosure, the control channel includes first indication information, and the first indication information is used for determining that the number of the first reference signals is the N.

In an embodiment of the present disclosure, the determination unit is configured to determine that the number of the first reference signals is N according to preconfigured information or information configured by a network.

In an embodiment of the present disclosure, transmission resources of the control channel of the first terminal and the first reference signals are in time-division.

An embodiment of the present disclosure provides an apparatus for determining information, including: a determination unit, configured to determine that a number of first reference signals sent by a first terminal is N, wherein N is a positive integer; and a receiving unit, configured to receive the N first reference signals sent by the first terminal via N channels respectively, wherein transmission resources of different channels are in time-division.

In an embodiment of the present disclosure, the receiving unit is further configured to receive a control channel sent by the first terminal; and the determination unit is configured to determine that the number of the first reference signals sent by the first terminal is N based on the control channel, wherein N is a positive integer.

In an embodiment of the present disclosure, the apparatus further includes a first processing unit configured to perform decoding operation on the control channel by using first codec information; and the determination unit is configured to determine a value of N corresponding to the first codec information as the number of the first reference signals based on a third mapping relationship.

In an embodiment of the present disclosure, the first codec information includes at least one of: a DMRS sequence, a cyclic shift, an OCC sequence, and a root sequence.

In an embodiment of the present disclosure, the determination unit is further configured to determine the third mapping relationship according to preconfigured information or information configured by a network.

In an embodiment of the present disclosure, the apparatus further includes a second processing unit configured to perform unmasking operation on the control channel by using first mask sequence; and the determination unit is configured to determine a value of N corresponding to the first mask sequence as the number of the first reference signals based on a second mapping relationship.

In an embodiment of the present disclosure, the determination unit is further configured to determine the second mapping relationship according to preconfigured information or information configured by a network.

In an embodiment of the present disclosure, the apparatus further includes a third processing unit configured to perform descrambling operation on the control channel by using first scrambling sequence; and the determination unit is configured to determine a value of N corresponding to the first scrambling sequence as the number of the first reference signals based on a first mapping relationship.

In an embodiment of the present disclosure, the determination unit is further configured to determine the first mapping relationship according to preconfigured information or information configured by a network.

In an embodiment of the present disclosure, the apparatus further includes an acquisition unit configured to acquire first indication information from the control channel; and the determination unit is configured to determine the number of the first reference signals based on the first indication information.

In an embodiment of the present disclosure, the determination unit is configured to determine that the number of the first reference signals sent by the first terminal is N according to preconfigured information or information configured by a network.

An embodiment of the present disclosure provides a computer storage medium, storing thereon computer-executable instructions, wherein when the computer-executable instructions are executed by a processor, a method for determining information as described above is implemented.

BRIEF DESCRIPTION OF DRAWINGS

The drawings described herein are for the purpose of providing a further understanding of the present disclosure and form a part of the present application. The illustrative embodiments of the present disclosure and the description thereof are for the purpose of explaining the present disclosure and are not intended to unduly limit the present disclosure. In the drawings.

DETAILED DESCRIPTION

To understand features and technical contents of embodiments of the present disclosure in more detail, the implementation of the embodiments of the present disclosure will be described in detail below with reference to the drawings, which are used for reference and description only and are not intended to limit the embodiments of the present disclosure.

In order to meet the requirements for supporting automatic driving, a multi-antenna transmission technology needs to be introduced into the NR-V2X. In the multi-antenna transmission technology, beamforming may improve coverage and reliability. How a data sending end selects an optimal beam among multiple candidate beams is realized by any of the following approaches.

Approach 1: a sending end needs to perform beam scanning and use different beams to perform transmission. A receiving end respectively receives the data transmitted by the beams, so that it can select a beam with a best transmission quality as the optimal beam, and feeds back an index value of the beam to the sending end; in a subsequent data transmission, the sending end may use the optimal beam for data transmission.

Approach 2: a receiving end sends multiple reference signals in an omnidirectional manner, a sending end receives the reference signals with different beams, and selects the beam corresponding to the reference signal with the best channel quality as the sending beam, and uses the selected best beam for data transmission in a subsequent data transmission.

In the approach 2, how the sending end and receiving end determine the number of reference signals is a problem to be solved.

In order to facilitate understanding of technical solutions of embodiments of the present disclosure, mode 3 and mode 4 in a Vehicle-to-Everything are explained below respectively.

Figure 1:
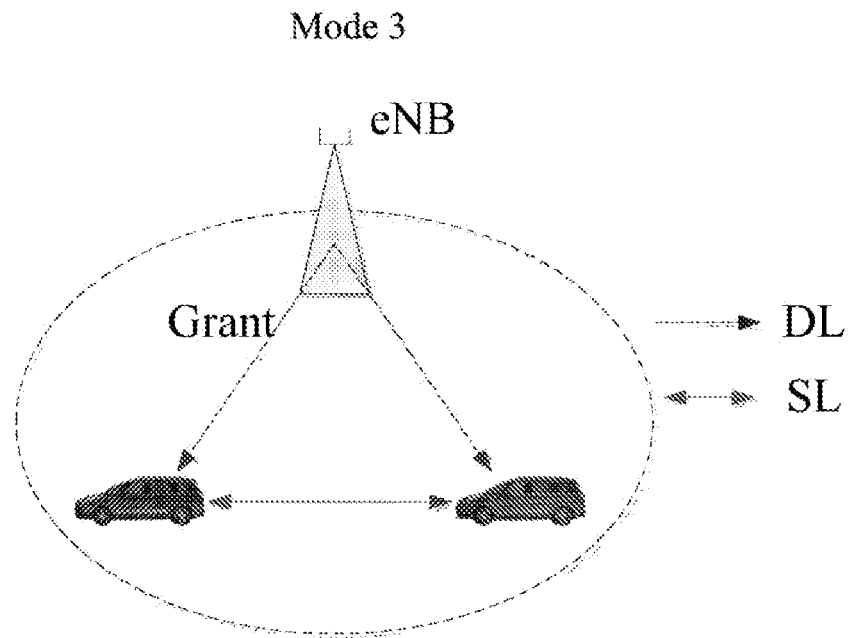
FIG. 1 is a schematic diagram of a scenario of mode 3 in a Vehicle-to-Everything.

Mode 3: as shown in FIG. 1, transmission resources of a vehicle user equipment are allocated by a base station (e.g., evolved NodeB in LTE). Specifically, the base station sends a control message for indicating grant resources to the vehicle user equipment via a Down Link (DL); then, the vehicle user equipment sends data on an SL according to the resources allocated by the base station. In the mode 3, the base station may allocate resources for a single transmission to the vehicle user equipment, or may allocate resources for semi-static transmission to the terminal.

Figure 2:
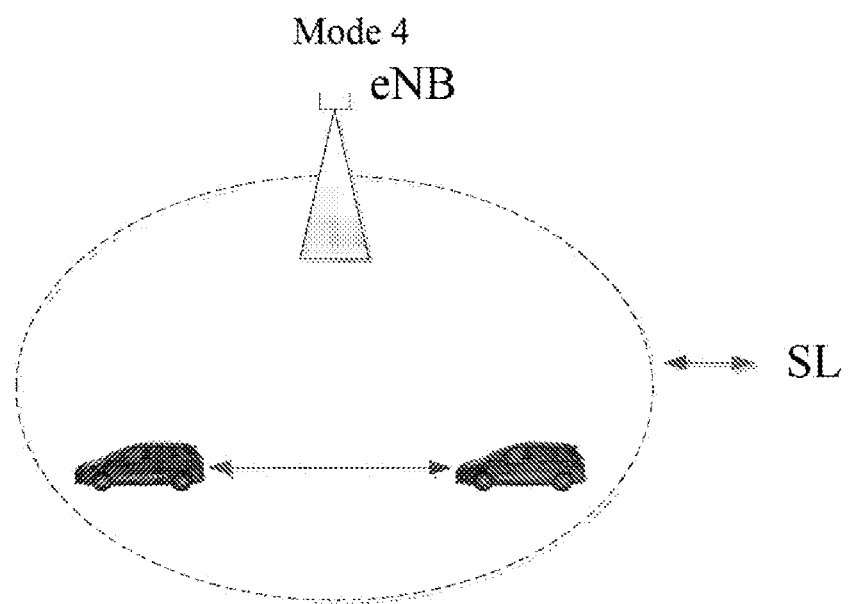
FIG. 2 is a schematic diagram of a scenario of mode 4 in a Vehicle-to-Everything.

Mode 4: as shown in FIG. 2, a vehicle user equipment adopts a transmission mode of sensing+reservation. The vehicle user equipment acquires a set of available transmission resources in a resource pool by sensing, and the vehicle user equipment randomly selects one resource from the set of transmission resources for data transmission. Since services in the V2X system have a characteristic of periodicity, the vehicle user equipment usually adopts a semi-static transmission mode, that is, after selecting one transmission resource, the vehicle user equipment persistently uses the resource in multiple transmission periods, thus reducing probabilities of resource re-selection and resource conflicts. The vehicle user equipment carries information of a resource reserved for a next transmission in the control information of a current transmission, so that other terminals may determine whether the resource is reserved and used by the terminal by detecting the control information of the vehicle user equipment, thus achieving a purpose of reducing resource conflicts.

It should be noted that in LTE-V2X, the use of mode 3 implies that the transmission resources of the vehicle user equipment are allocated by the base station, and the use of mode 4 implies that the transmission resources of the vehicle user equipment are selected by the terminal itself. In NR-V2X, a new transmission mode may be defined, which is not restricted in the present disclosure.

Multi-antenna transmission technology needs to be introduced into the NR-V2X. Multi-antenna may bring benefits in several aspects as follows.

1) Higher transmission rate: multiple data streams may be transmitted on a same time-frequency resource by using the multiplex transmission mode of multiple antennas, thus improving a transmission rate.

2) Larger coverage and higher reliability: by using a beamforming technology, energy may be concentrated in a narrow beam, thus improving a signal to interference plus noise ratio (SINR) of a receiving end, thus improving a probability of successful reception at the receiving end or increasing a transmission distance.

In one embodiment of the present disclosure, a reference signal sending end (i.e., a first terminal) sends N first reference signals (also referred to as beam training reference signals or beam scanning reference signals), and a reference signal receiving end (i.e., a second terminal) receives the N first reference signals with corresponding N different channels (also referred to as beams) respectively, and selects an optimal channel (i.e., a target channel) for data transmission.

According to the technical solution of an embodiment of the present disclosure, the number of the first reference signals may be determined in a Vehicle-to-Everything system. Specifically, the number of the first reference signals may be explicitly or implicitly indicated through a Physical Side link Control Channel (PSCCH) of the reference signal sending end. Alternatively, the first terminal and the second terminal may determine the number of first reference signals through preconfigured information or information configured by the network.

All technical solutions of the embodiments of the present disclosure are not only applicable to the Vehicle-to-Everything system, but also applicable to other end-to-end communication systems. The terminal in embodiments of the present disclosure may be a vehicle user equipment, a handheld terminal, a PDA (Personal Digital Assistant), or a wearable terminal, etc. The network in embodiments of the present disclosure may be a NR network, or a LTE network, etc.

Figure 3:
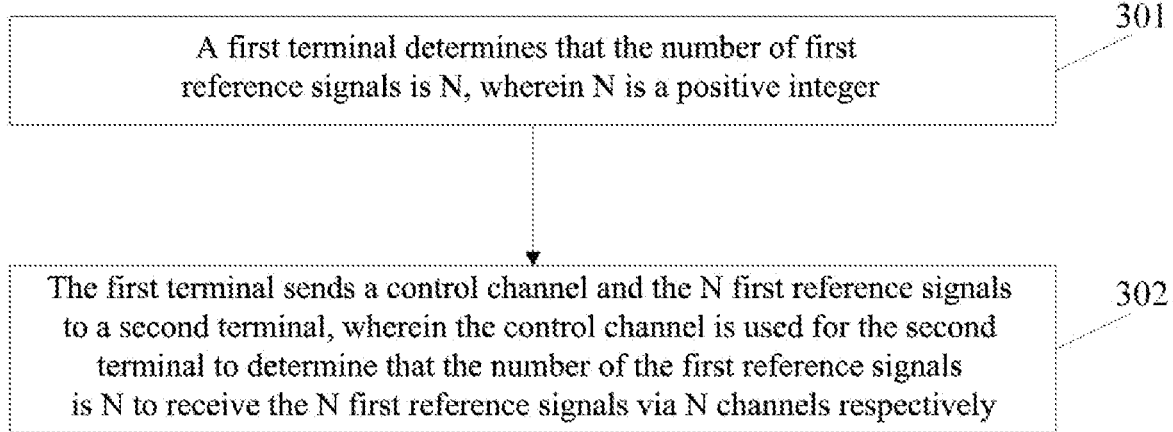
FIG. 3 is a first schematic flowchart of a method for determining information according to an embodiment of the present disclosure.

FIG. 3 is a first schematic flowchart of a method for determining information according to an embodiment of the present disclosure. As shown in FIG. 3, the method for determining information includes the following acts 301-302.

In act 301, a first terminal determines that the number of first reference signals is N, wherein N is a positive integer.

In an embodiment of the present disclosure, types of the first terminal and a second terminal are not limited and may be devices such as vehicle user equipment, mobile phones, notebook computers, etc.

In an embodiment of the present disclosure, the first terminal determines that the number of the first reference signals is N according to preconfigured information or information configured by the network or through autonomous selection.

In act 302, the first terminal sends a control channel and the N first reference signals to the second terminal, wherein the control channel is used for the second terminal to determine that the number of the first reference signals is the N so as to receive the N first reference signals via N channels respectively.

In an embodiment of the present disclosure, the first terminal sends the N first reference signals in an omnidirectional manner, wherein the N first reference signals are in time-division. The second terminal receives the N first reference signals respectively via N channels (also called beams).

In an embodiment of the present disclosure, the first terminal sends a control channel to the second terminal, and the control channel is used for the second terminal to determine that the number of the first reference signals is the N. Transmission resources of the control channel of the first terminal and the first reference signals are in time-division.

For example, the first terminal sends a Physical Side link Control Channel (PSCCH) on a subframe n, and sends the first reference signals on a subframe n+m, where m is an integer greater than 0. Alternatively, the first terminal sends the PSCCH on symbols p to p+P−1, wherein p represents a total number of symbols occupied by the PSCCH, and starts sending the first reference signals on symbol p+P−1+q, where q is an integer greater than 0. If the first terminal sends N first reference signals, the first terminal sends the first one of the first reference signals on a symbol p+P−1+q, and the number of symbols between two adjacent first reference signals may be predefined or configured by the network.

In an embodiment of the present disclosure, the control channel of the first terminal is used for the second terminal to determine that the number of the first reference signals is the N, and approaches for the implementation are as follows.

Approach 1: the number of the first reference signals is explicitly indicated through the control channel of the first terminal.

The control channel includes first indication information for determining that the number of the first reference signals is the N.

For example, in the PSCCH of the first terminal, the value of N is represented by K bits, and K is a positive integer, such as 2, 3, 4, etc. The second terminal acquires the first indication information from the control channel of the first terminal, and after determining the value of N based on the first indication information, may select a corresponding number (i.e., N) of channels to aim at the N first reference signals in the time domain for reception.

Approach 2: the number of the first reference signals is implicitly indicated through the control channel of the first terminal.

Herein, the first terminal performs the following processing on the control channel before sending the control channel: performing scrambling operation on the control channel by using specific scrambling sequence (such as first scrambling sequence); and/or performing masking operation on the control channel by using specific mask sequence (such as first mask sequence); and/or performing encoding operation on the control channel by using specific codec information (such as first codec information). Correspondingly, after receiving the control channel, the second terminal needs to perform decoding operation on the control channel by using the specific codec information (such as the first codec information); and/or perform unmasking operation on the control channel by using the specific mask sequence (such as the first mask sequence); and/or perform descrambling operation on the control channel by using the specific scrambling sequence (such as the first scrambling sequence).

In an embodiment of the disclosure, a first mapping relationship between the first scrambling sequence and the value of N is established, or a second mapping relationship between the first mask sequence and the value of N is established, or a third mapping relationship between the first codec information and the value of N is established. As such, the second terminal may implicitly acquire the value of N according to the first scrambling sequence, the first mask sequence, or the first codec information corresponding to the control information. Detailed description is provided below.

1.1) The first terminal determines the first scrambling sequence corresponding to the value of N based on the first mapping relationship; and the first terminal performs the scrambling operation on the control channel by using the first scrambling sequence; wherein the first scrambling sequence corresponding to the control channel is used for determining that the number of the first reference signals is the N. In one embodiment, the first terminal determines the first mapping relationship according to preconfigured information or information configured by the network.

For example, Table 1 shows the first mapping relationship between the first scrambling sequence and the value of N. Assuming that the value of N is 4, it can be seen from Table 1 that the first scrambling sequence corresponding to 4 is scrambling sequence 1.

TABLE 1

| First scrambling sequence | Value of N |
| --- | --- |
| Scrambling sequence 1 | 4 |
| Scrambling sequence 2 | 8 |
| Scrambling sequence 3 | 16 |
| Scrambling sequence 4 | 32 |

1.2) The first terminal determines the first mask sequence corresponding to the value of N based on the second mapping relationship; and the first terminal performs masking operation on the control channel by using the first mask sequence; wherein the first mask sequence corresponding to the control channel is used for determining that the number of the first reference signals is the N. In one embodiment, the first terminal determines the second mapping relationship according to preconfigured information or information configured by the network.

For example, Table 2 shows the second mapping relationship between the first mask sequence and the value of N. Assuming that the value of N is 8, it can be seen from Table 2 that the first mask sequence corresponding to 8 is mask sequence 2.

TABLE 2

| First mask sequence | Value of N |
| --- | --- |
| Mask sequence 1 | 4 |
| Mask sequence 2 | 8 |

TABLE 2-continued

| First mask sequence | Value of N |
| --- | --- |
| Mask sequence 3 | 16 |
| Mask sequence 4 | 32 |

1.3) The first terminal determines the first codec information corresponding to the value of N based on the third mapping relationship; and the first terminal performs encoding operation on the control channel by using the first codec information; wherein the first codec information corresponding to the control channel is used for determine that the number of the first reference signals is the N. In one embodiment, the first codec information includes at least one of: a DMRS sequence, a cyclic shift, an OCC sequence, and a root sequence. In one embodiment, the first terminal determines the third mapping relationship according to preconfigured information or information configured by the network.

Taking the first codec information including a DMRS sequence as an example, Table 3 shows the third mapping relationship between the first codec information and the value of N. Assuming that the value of N is 16, it can be seen from Table 3 that the first codec information corresponding to 16 is DMRS sequence 3.

TABLE 3

| First codec information | Value of N |
| --- | --- |
| DMRS sequence 1 | 4 |
| DMRS sequence 2 | 8 |
| DMRS sequence 3 | 16 |
| DMRS sequence 4 | 32 |

In the embodiment, the number of first reference signals of the first terminal may be preconfigured or configured by the network (e.g., in the mode 3, the network configures the number of first reference signals for the first terminal) or selected autonomously. The first terminal selects an appropriate number of first reference signals, and explicitly or implicitly carries the number information of the first reference signals in the control channel. The second terminal receives the control channel of the first terminal, thereby acquiring the corresponding number information of the reference signals, and receives the reference signals with a corresponding number of beams. In addition, the control channel and the first reference signals of the first terminal are in time division. For example, the control channel is sent in subframe or time slot n, the first reference signals are sent in subframe or time slot n+m, and m is an integer greater than 0. For another example, the control channel is sent in symbol n, the first reference signals are sent in symbol n+m, and m is an integer greater than 0. In specific applications, the control channel and the first reference signals may be within one subframe or time slot, or may span multiple subframes or time slots.

Figure 4:
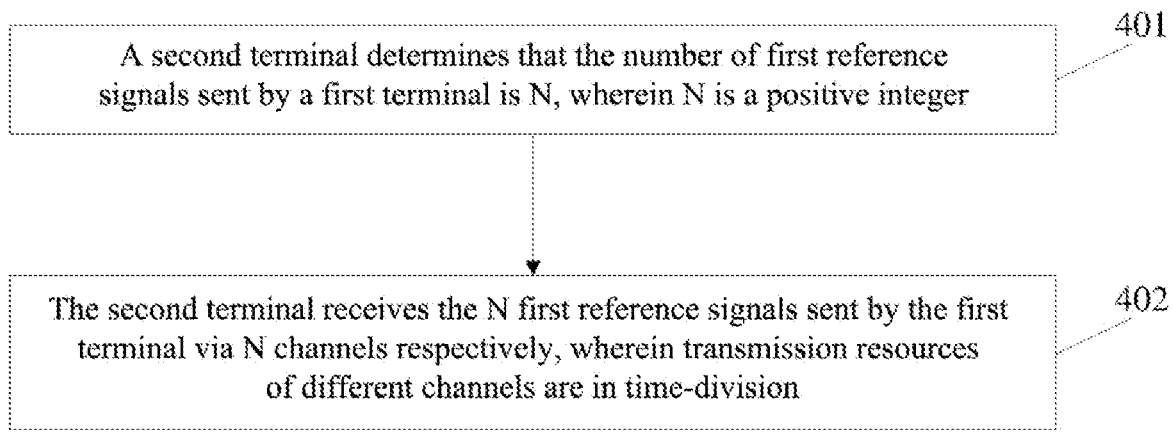
FIG. 4 is a second schematic flowchart of a method for determining information according to an embodiment of the present disclosure.

FIG. 4 is a second schematic flowchart of a method for determining information according to an embodiment of the present disclosure. As shown in FIG. 4, the method for determining information includes the following acts 401-402.

In act 401, a second terminal determines that the number of first reference signals sent by a first terminal is N, wherein N is a positive integer.

In an embodiment of the present disclosure, the types of the first terminal and the second terminal are not limited and may be devices such as vehicle user equipment, mobile phones, notebook computers, etc.

In an embodiment of the present disclosure, that the second terminal determines that the number of first reference signals sent by the first terminal is N may be realized by any of the following two approaches.

Approach 1: the second terminal determines that the number of first reference signals sent by the first terminal is N according to preconfigured information or information configured by the network.

Approach 2: the second terminal receives a control channel sent by the first terminal, and determines that the number of first reference signals sent by the first terminal is N based on the control channel, wherein N is a positive integer.

As for the approach 2, it further includes two manners as follows.

2.1) Explicitly indicating the number of the first reference signals through the control channel of the first terminal.

Specifically, the second terminal receives the control channel sent by the first terminal, and acquires first indication information from the control channel; and the second terminal determines the number of the first reference signals based on the first indication information.

2.2) Implicitly indicating the number of the first reference signals through the control channel of the first terminal.

Herein, that the control channel of the first terminal implicitly indicates the number of the first reference signals may be realized in any of the following ways.

2.21) The second terminal receives the control channel sent by the first terminal, and performs decoding operation on the control channel by using the first codec information; and the second terminal determines the value of N corresponding to the first codec information as the number of the first reference signals based on the third mapping relationship.

In one embodiment, the first codec information includes at least one of: a DMRS sequence, a cyclic shift, an OCC sequence, and a root sequence.

In one embodiment, the second terminal determines the third mapping relationship according to preconfigured information or information configured by the network.

2.22) The second terminal receives the control channel sent by the first terminal and performs unmasking operation on the control channel by using the first mask sequence; the second terminal determines the value of N corresponding to the first mask sequence as the number of the first reference signals based on the second mapping relationship.

In one embodiment, the second terminal determines the second mapping relationship according to preconfigured information or information configured by the network.

2.23) The second terminal receives the control channel sent by the first terminal and performs descrambling operation on the control channel by using the first scrambling sequence; the second terminal determines the value of N corresponding to the first scrambling sequence as the number of the first reference signals based on the first mapping relationship.

In one embodiment, the second terminal determines the first mapping relationship according to preconfigured information or information configured by the network.

Act 402: the second terminal receives the N first reference signals sent by the first terminal via N channels respectively, wherein transmission resources of different channels are in time-division.

In an embodiment of the present disclosure, that the second terminal receives the N first reference signals sent by the first terminal through N channels respectively is realized by the following way: the second terminal uses the beamforming technology to form N beams, wherein the transmission resources of different beams are in time-division, and one beam represents one channel, and the second terminal receives the N first reference signals sent by the first terminal by using N beams (i.e., channels) respectively by beam polling, wherein the N first reference signals are in time-division, and the transmission resources may be time-frequency resources.

For example, the first terminal sends N first reference signals, each of which occupies 1 Orthogonal Frequency Division Multiplexing (OFDM) symbol. After the second terminal determines the value of N, it receives the N first reference signals by using N beams respectively, that is, the second terminal respectively receives the first reference signals via N beams on the N symbols where the first reference signals are located.

Figure 5:
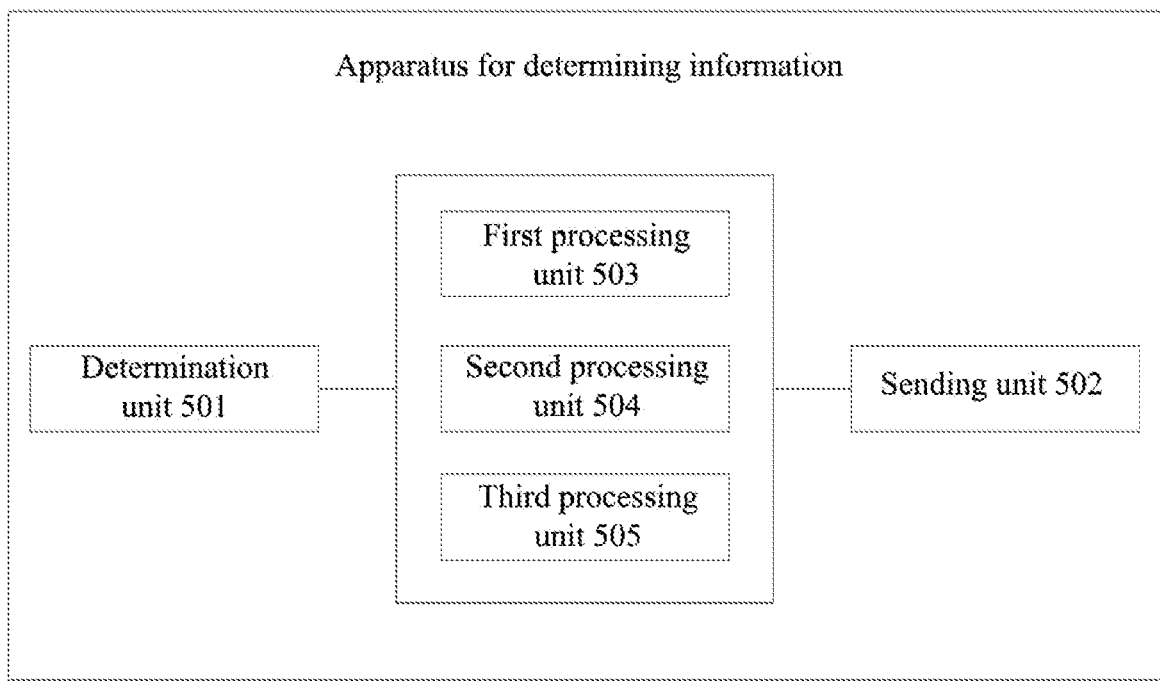
FIG. 5 is a first schematic diagram of the structural composition of an apparatus for determining information according to an embodiment of the present disclosure.

FIG. 5 is a first schematic diagram of the structural composition of an apparatus for determining information according to an embodiment of the present disclosure. As shown in FIG. 5, the apparatus for determining information includes a determination unit 501 and a sending unit 502.

The determination unit 501 is configured to determine that the number of first reference signals is N, wherein N is a positive integer.

The sending unit 502 is configured to send a control channel and the N first reference signals to a second terminal, wherein the control channel is used for the second terminal to determine that the number of the first reference signals is the N to receive the N first reference signals via N channels respectively.

In one embodiment, the determination unit 501 is further configured to determine first scrambling sequence corresponding to the value of N based on a first mapping relationship.

The apparatus further includes: a first processing unit 503, configured to perform scrambling operation on the control channel by using the first scrambling sequence; wherein the first scrambling sequence corresponding to the control channel is used for determining that the number of the first reference signals is the N.

In one embodiment, the determination unit 501 is further configured to determine the first mapping relationship according to preconfigured information or information configured by the network.

In one embodiment, the determination unit 501 is further configured to determine first mask sequence corresponding to the value of N based on a second mapping relationship.

The apparatus further includes: a second processing unit 504, configured to perform masking operation on the control channel by using the first mask sequence; wherein the first mask sequence corresponding to the control channel is used for determining that the number of the first reference signals is the N.

In one embodiment, the determination unit 501 is further configured to determine the second mapping relationship according to preconfigured information or information configured by the network.

In one embodiment, the determination unit 501 is further configured to determine first codec information corresponding to the value of N based on a third mapping relationship.

The apparatus further includes: a third processing unit 505, configured to perform encoding operation on the control channel by using the first codec information; wherein the first codec information corresponding to the control channel is used for determining that the number of the first reference signals is the N.

In one embodiment, the first codec information includes at least one of: a DMRS sequence, a cyclic shift, an OCC sequence, and a root sequence.

In one embodiment, the determination unit 501 is further configured to determine the third mapping relationship according to preconfigured information or information configured by the network.

In one embodiment, the control channel includes first indication information, and the first indication information is used for determining that the number of the first reference signals is the N.

In one embodiment, the determination unit 501 is configured to determine that the number of the first reference signals is N according to preconfigured information or information configured by the network.

In one embodiment, transmission resources of the control channel of the first terminal and the first reference signals are in time-division.

Those skilled in the art should understand that the implementation function of each unit in the apparatus for determining information shown in FIG. 5 may be understood with reference to the relevant description of the aforementioned method for determining information. The function of each unit in the apparatus for determining information shown in FIG. 5 may be realized by a program running on a processor or by a specific logic circuit.

Figure 6:
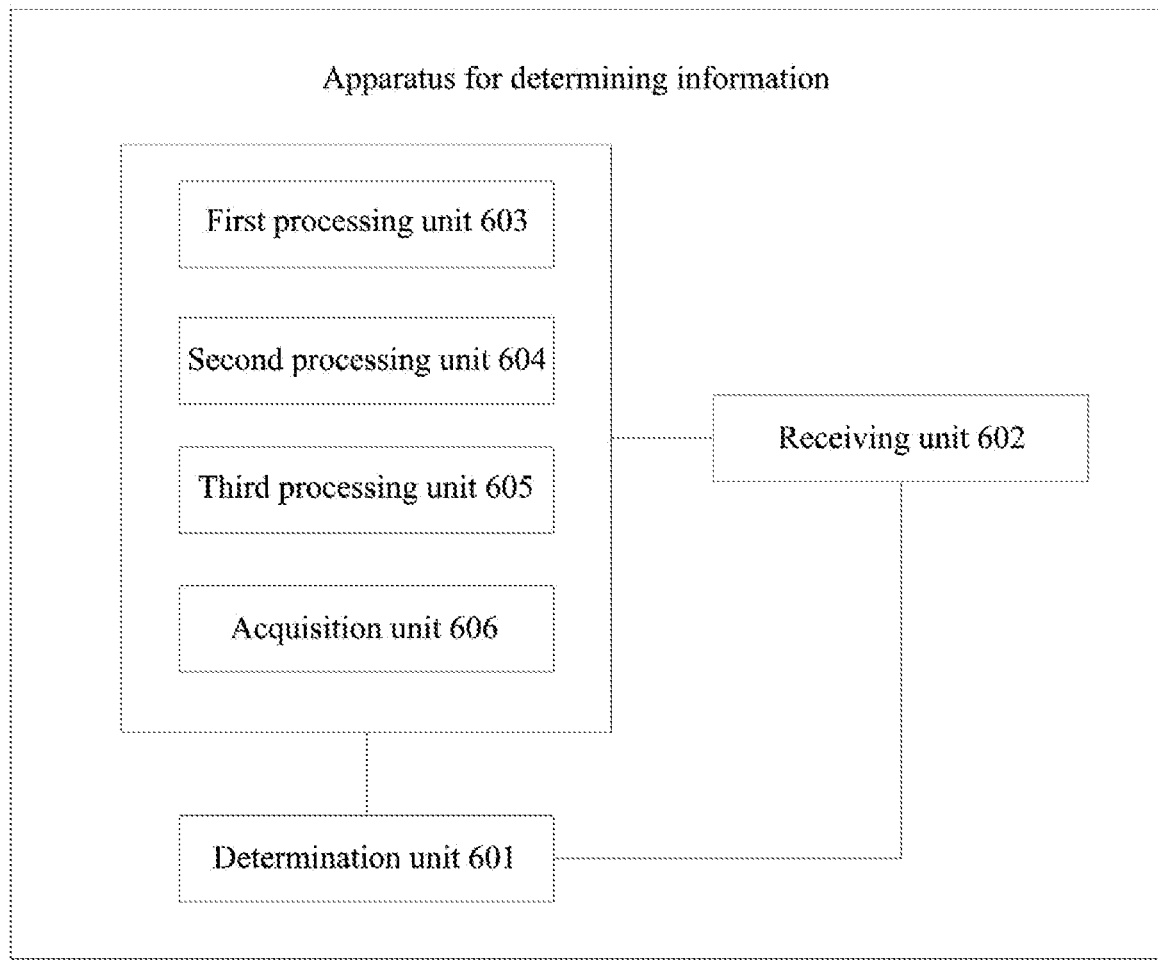
FIG. 6 is a second schematic diagram of the structural composition of an apparatus for determining information according to an embodiment of the present disclosure.

FIG. 6 is a second schematic diagram of the structural composition of an apparatus for determining information according to an embodiment of the present disclosure. As shown in FIG. 6, the apparatus for determining information includes a determination unit 601 and a receiving unit 602.

The determination unit 601 is configured to determine that the number of first reference signals sent by a first terminal is N, wherein N is a positive integer.

The receiving unit 602 is configured to receive the N first reference signals sent by the first terminal via N channels respectively, wherein transmission resources of different channels are in time-division.

In one embodiment, the receiving unit 602 is further configured to receive a control channel sent by the first terminal.

The determination unit 601 is configured to determine that the number of first reference signals sent by the first terminal is N based on the control channel, wherein N is a positive integer.

In one embodiment, the apparatus further includes a processing unit 603.

The first processing unit 603 is configured to perform decoding operation on the control channel by using first codec information.

The determination unit 601 is configured to determine the value of N corresponding to the first codec information as the number of the first reference signals based on a third mapping relationship.

In one embodiment, the first codec information includes at least one of: a DMRS sequence, a cyclic shift, an OCC sequence, and a root sequence.

In one embodiment, the determination unit 601 is further configured to determine the third mapping relationship according to preconfigured information or information configured by the network.

In one embodiment, the apparatus further includes a second processing unit 604.

The second processing unit 604 is configured to perform unmasking operation on the control channel by using first mask sequence.

The determination unit 601 is configured to determine the value of N corresponding to the first mask sequence as the number of the first reference signals based on a second mapping relationship.

In one embodiment, the determination unit 601 is further configured to determine the second mapping relationship according to preconfigured information or information configured by the network.

In one embodiment, the apparatus further includes a third processing unit 605.

The third processing unit 605 is configured to perform descrambling operation on the control channel by using first scrambling sequence.

The determination unit 601 is configured to determine the value of N corresponding to the first scrambling sequence as the number of the first reference signals based on the first mapping relationship.

In one embodiment, the determination unit 601 is further configured to determine the first mapping relationship according to preconfigured information or information configured by the network.

In one embodiment, the apparatus further includes an acquisition unit 606.

The acquisition unit 606 is configured to acquire first indication information from the control channel.

The determination unit 601 is configured to determine the number of the first reference signals based on the first indication information.

In one embodiment, the determination unit 601 is configured to determine that the number of first reference signals sent by the first terminal is N according to preconfigured information or information configured by the network.

Those skilled in the art should understand that the implementation function of each unit in the apparatus for determining information shown in FIG. 6 may be understood with reference to the relevant description of the aforementioned method for determining information. The function of each unit in the apparatus for determining information shown in FIG. 6 may be realized by a program running on a processor or by a specific logic circuit.

The above apparatus for determining information in the embodiments of the present disclosure may also be stored in a computer readable storage medium when it is implemented in the form of software function modules and sold or used as an independent product. Based on this understanding, the technical solutions in the embodiments of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various embodiments of the present disclosure. The aforementioned storage medium includes various media capable of storing program codes such as a U disk, a mobile hard disk, a read-only memory (ROM), a magnetic disk or an optical disk. Thus, the embodiments of the present disclosure are not limited to any specific combination of hardware and software.

Correspondingly, an embodiment of the present disclosure also provides a computer storage medium in which computer executable instructions are stored, and when the computer executable instructions are executed by a processor, the above method for determining information of an embodiment of the present disclosure is implemented.

Figure 7:
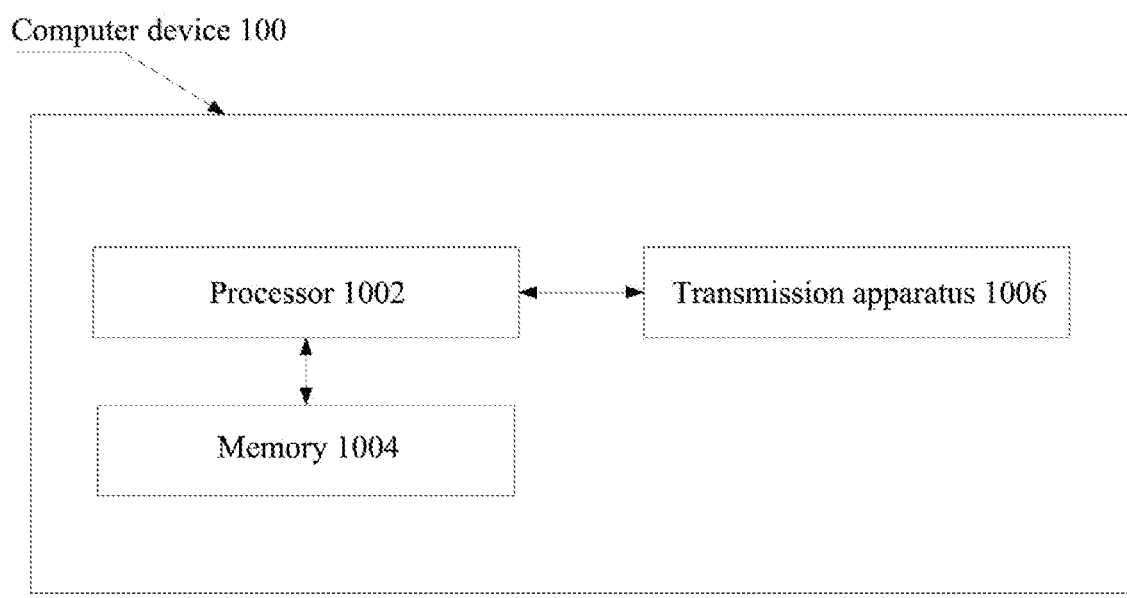
FIG. 7 is a schematic diagram of the structural composition of a computer device according to an embodiment of the present disclosure.

FIG. 7 is a schematic diagram of the structural composition of a computer device according to an embodiment of the present disclosure, and the computer device may be any type of terminal. As shown in FIG. 7, the computer device 100 may include one or more (only one is shown in the figure) processors 1002 (the processors 1002 may include, but not limited to, a processing apparatus such as a Micro Controller Unit (MCU), or a Field Programmable Gate Array (FPGA), etc.), a memory 1004 for storing data, and a transmission apparatus 1006 for communication functions. One of ordinary skill in the art may understand that the structure shown in FIG. 7 is only schematic and does not limit the structure of the above electronic device. For example, the computer device 100 may include more or fewer components than those shown in FIG. 7, or have a different configuration than that shown in FIG. 7.

The memory 1004 may be used to store software programs and modules of application software, such as program instructions/modules corresponding to the method in an embodiment of the present disclosure. The processor 1002 executes various functional applications and data processing by running the software programs and modules stored in the memory 1004, i.e., realizes the above method. The memory 1004 may include a high-speed random access memory and may also include a non-transitory memory such as one or more magnetic storage apparatus, flash memory, or other non-transitory solid-state memories. In some examples, the memory 1004 may further include a memory configured remotely from the processor 1002, which may be connected to the computer device 100 through a network. Examples of the network include, but not limited to, the Internet, an intranet, a local area network, a mobile communication network, and combinations thereof.

The transmission device 1006 is used for receiving or transmitting data via a network. Specific examples of the network may include a wireless network provided by a communication provider of the computer device 100. In one example, the transmission device 1006 includes a network interface controller (NIC), which may be connected to other network devices through a base station so as to communicate with the Internet. In one example, the transmission device 1006 may be a radio frequency (RF) module for communicating with the Internet wirelessly.

The technical solutions described in embodiments of the present disclosure may be combined arbitrarily if there is no conflict.

In several embodiments provided by the present disclosure, it should be understood that the disclosed methods and smart devices may be implemented in other ways. The device embodiments described above are only illustrative, for example, the division of the units is only a logical function division, and there may be other division manners in actual implementation. For example, multiple units or components may be combined or integrated into another system, or some features may be ignored or not executed. In addition, the mutual coupling or direct coupling or communication connection between various components shown or discussed may be through some interface, and indirect coupling or communication connection between apparatus or units may be electrical, mechanical or in other forms.

The units described as separate components may or may not be physically separated, and a component shown as a unit may or may not be a physical unit, i.e., it may be located in one place or may be distributed over multiple network units. Some or all of the units may be selected according to practical needs to achieve a purpose of the solution of an embodiment.

In addition, various functional units in various embodiments of the present disclosure may be integrated in one processing unit, or various units may be present as separate units, or two or more units may be integrated in one unit. The above-mentioned integrated unit may be implemented in a form of hardware or in a form of hardware plus software functional units.

What are described above are merely exemplary embodiments of the present disclosure, but the protection scope of the present disclosure is not limited thereto. Any person skilled in the art may easily conceive variations or substitutions within the technical scope disclosed by the present disclosure, which shall be included within the protection scope of the present disclosure.

What is claimed is:

1. A method for determining information, comprising:
   determining, by a first terminal, that a number of first reference signals is N, wherein N is a positive integer;
   determining, by the first terminal, a first scrambling sequence corresponding to a value of the N based on a first mapping relationship;
   performing, by the first terminal, a scrambling operation on a control channel by using the first scrambling sequence, wherein the first scrambling sequence corresponding to the control channel is used for determining that the number of the first reference signals is N; and
   sending, by the first terminal, the control channel and the N first reference signals to a second terminal, wherein the control channel is a Physical Sidelink Control Channel (PSCCH) and indicates the number of the first reference signals, and wherein the control channel is used for the second terminal to determine that the number of the first reference signals is N and to receive the N first reference signals via N channels respectively.

2. The method of claim 1, wherein the method further comprises:
   determining, by the first terminal, first codec information corresponding to a value of the N based on a third mapping relationship; and
   performing, by the first terminal, encoding operation on the control channel by using the first codec information; wherein the first codec information corresponding to the control channel is used for determining that the number of the first reference signals is N.

3. The method of claim 2, wherein the first codec information comprises at least one of:
   a demodulation reference signal (DMRS) sequence, a cyclic shift, an orthogonal cover code (OCC) sequence, or a root sequence.

4. The method of claim 2, wherein determining, by the first terminal, that the number of first reference signals is N, comprises:
   determining, by the first terminal, that the number of the first reference signals is N according to preconfigured information or information configured by a network.

5. The method of claim 1, wherein the control channel comprises first indication information, and the first indication information is used for determining that the number of the first reference signals is N.

6. The method of claim 1, wherein determining, by the first terminal, that the number of first reference signals is N, comprises:
   determining, by the first terminal, that the number of the first reference signals is N according to preconfigured information or information configured by a network.

7. The method of claim 1, wherein determining, by the first terminal, that the number of first reference signals is N, comprises:
 determining, by the first terminal, that the number of the first reference signals is N according to preconfigured information or information configured by a network.

8. The method of claim 1, wherein transmission resources of the control channel of the first terminal and the first reference signals are in time-division.

9. The method of claim 1, wherein transmission resources of the control channel of the first terminal and the first reference signals are in time-division.

10. A non-transitory computer storage medium, storing thereon computer-executable instructions, wherein when the computer-executable instructions are executed by a processor, the steps of the method of claim 1 are implemented.

11. An apparatus for determining information, comprising a processor, a memory, and a network interface controller, wherein the memory stores program instructions that, when executed by the processor, cause the processor to perform following acts:
 determining that a number of first reference signals is N, wherein N is a positive integer;
 determining a first scrambling sequence corresponding to a value of the N based on a first mapping relationship;
 performing a scrambling operation on a control channel by using the first scrambling sequence, wherein the first scrambling sequence corresponding to the control channel is used for determining that the number of the first reference signals is N; and
 sending, via the network interface controller, the control channel and N first reference signals to a second terminal, wherein the control channel is a Physical Sidelink Control Channel (PSCCH) and indicates the number of the first reference signals, and wherein the control channel is used for the second terminal to determine that the number of the first reference signals is N and to receive the N first reference signals via N channels respectively.

12. The apparatus of claim 11, wherein when the program instructions are executed by the processor, the program instructions cause the processor to further perform following acts:
 determining first codec information corresponding to a value of the N based on a third mapping relationship; and
 performing encoding operation on the control channel by using the first codec information; wherein the first codec information corresponding to the control channel is used for determining that the number of the first reference signals is N.

13. The apparatus of claim 12, wherein the first codec information comprises at least one of:
 a demodulation reference signal (DMRS) sequence, a cyclic shift, an orthogonal cover code (OCC) sequence, or a root sequence.

14. The apparatus of claim 12, wherein determining that the number of first reference signals is N comprises:
 determining that the number of the first reference signals is N according to preconfigured information or information configured by a network.

15. The apparatus of claim 11, wherein the control channel comprises first indication information, and the first indication information is used for determining that the number of the first reference signals is N.

16. The apparatus of claim 11, wherein determining that the number of first reference signals is N comprises:
 determining that the number of the first reference signals is N according to preconfigured information or information configured by a network.

17. The apparatus of claim 11, wherein determining that the number of first reference signals is N comprises:
 determining that the number of the first reference signals is N according to preconfigured information or information configured by a network.

18. The apparatus of claim 11, wherein transmission resources of the control channel of the apparatus and the first reference signals are in time-division.

\* \* \* \* \*